G. F. WEST.
MEDICATED POULTRY ROOST.
APPLICATION FILED MAR. 4, 1910.

978,526.

Patented Dec. 13, 1910.

Witnesses
W. P. Woodson
Juana M. Fallin

Inventor
G. F. WEST
By H. A. Lacey, Attorney

UNITED STATES PATENT OFFICE.

GLEN FULTON WEST, OF COLBY, KANSAS.

MEDICATED POULTRY-ROOST.

978,526.

Specification of Letters Patent. Patented Dec. 13, 1910.

Application filed March 4, 1910. Serial No. 547,303.

*To all whom it may concern:*

Be it known that I, GLEN FULTON WEST, citizen of the United States, residing at Colby, in the county of Thomas and State of Kansas, have invented certain new and useful Improvements in Medicated Poultry-Roosts, of which the following is a specification.

This invention comprehends certain new and useful improvements in poultry roosts, and relates particularly to that class of roosts in which an insecticide is used so as to destroy the vermin which ordinarily infest the fowls.

The primary object of the invention is a simple, durable and efficient construction of roost of this type which is capable of being folded up so that it may occupy a minimum amount of space when being shipped, or when not in use and which may easily be set up to an angular or inverted U-shape when desired for use.

With these and other objects in view as will more fully appear as the description proceeds, the invention consists in certain constructions, arrangements and combinations of the parts that I shall hereinafter fully describe and claim.

Figure 1:
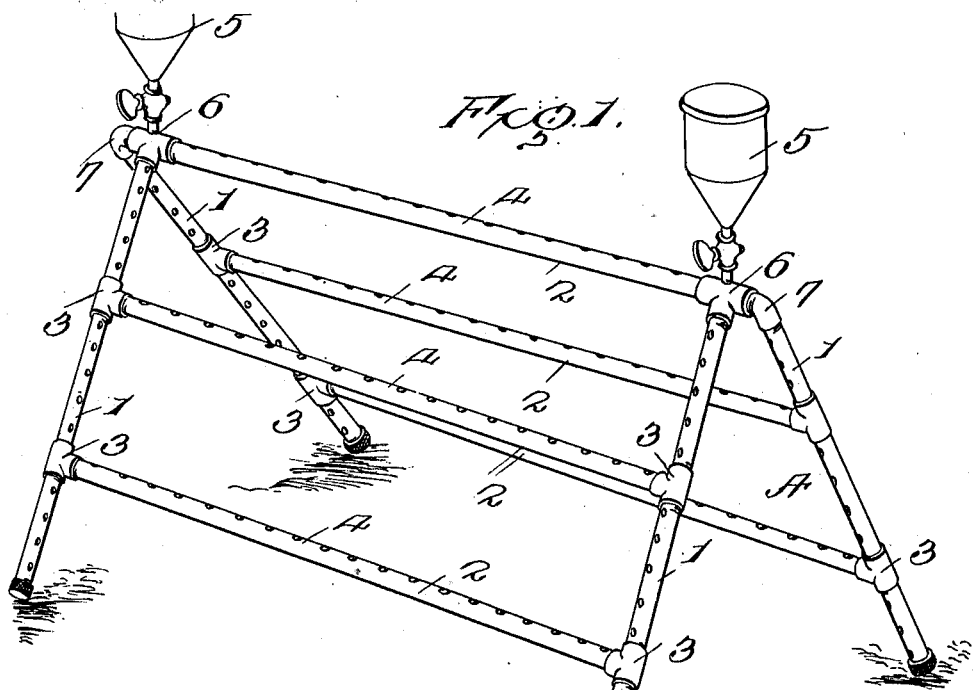
Figure 2:
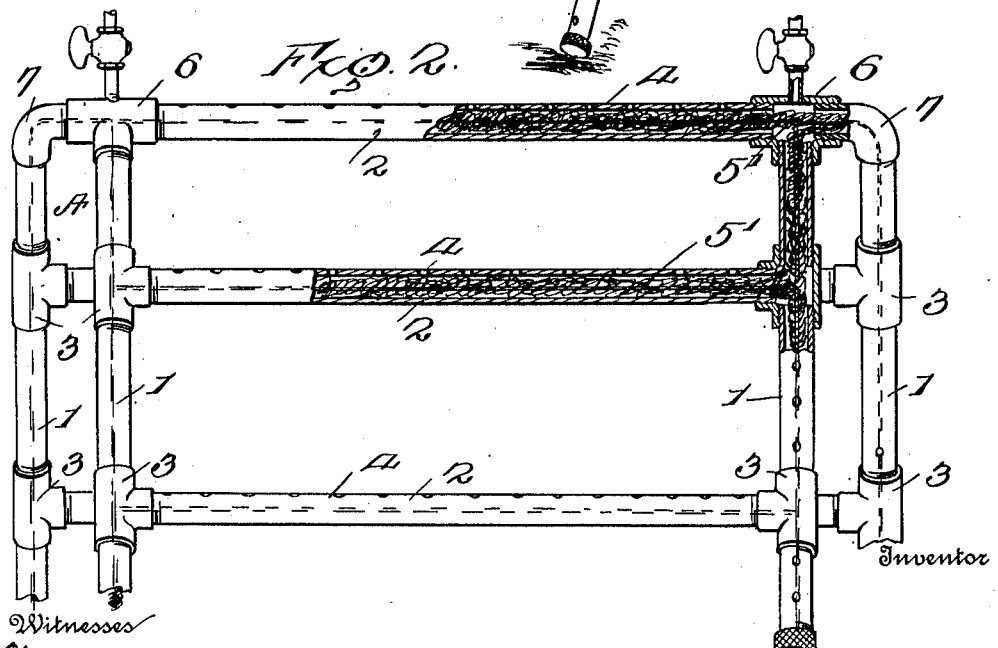

For a full understanding of the invention, reference is to be had to the following description and accompanying drawings in which:

Figure 1 is a perspective view of a chicken roost constructed in accordance with my invention; and Fig. 2 is a side elevation thereof, partly in section.

Corresponding and like parts are referred to in the following description and indicated in all the views of the accompanying drawings by the same reference characters.

My improved poultry roost comprises two frames A each of which embodies tubular leg members 1 of any desired length, and any desired number of tubular cross bars 2 which are connected to the leg members 1 with the cross bars in spaced relation to each other, by T-couplings 3, as clearly illustrated in the drawings. The cross bars 2 are formed with any desired number of perforations 4 and are designed to contain a wicking which is saturated with some insecticide, the supply being obtained preferably from tanks or reservoirs 5 which are mounted upon T-couplings which connect the uppermost cross bar 2 to the upper ends of the legs 1, the said T couplings being designated 6 to distinguish them from the others. The legs of one of the frames are provided at their upper ends with elbows 7, and these elbows have a screw thread engagement with the outwardly projecting ends of the T-couplings 6 whereby, as is evident, the two frames may be spread apart to assume different angular relations with each other and thus be set up in an operative position. When it is not desired to use the roost, one frame may be folded up against the other so as to economize space.

Having thus described the invention, what is claimed as new is:

1. A poultry roost comprising tubular frames, consisting of tubular leg members and cross bars connected at their ends to the leg members, T-couplings serving to connect the upper cross bar of one frame to the upper ends of the leg members of said frame, elbow couplings connected to the upper ends of the leg members of the other frame and having an adjustable connection with said T-couplings whereby the legs may be folded upon or spread out from the legs of the other frame, the legs being perforated, and wicking contained within the legs.

2. A poultry roost of the character described, comprising tubular frames consisting of tubular leg members and tubular crossbars connected at their ends to the leg members, T-couplings serving to connect the upper cross bar of one frame to the upper ends of the leg members of said frame, elbow couplings connected to the upper ends of the leg members of the other frame and having a screw thread connection with said T-couplings whereby the legs may be folded upon or spread out from the legs of the other frame, the cross bars being formed with upwardly facing perforations, a tank arranged to feed insecticide into said frames, and wicking contained within the legs and cross bars.

In testimony whereof I affix my signature in presence of two witnesses.

GLEN FULTON WEST. [L. S.]

Witnesses:
 W. N. WOODSON,
 FREDERICK S. STITT.